United States Patent
Kato et al.

(10) Patent No.: US 10,047,448 B2
(45) Date of Patent: Aug. 14, 2018

(54) TIN-PLATED COPPER-ALLOY TERMINAL MATERIAL

(71) Applicant: MITSUBISHI MATERIALS CORPORATION, Tokyo (JP)

(72) Inventors: Naoki Kato, Tokyo (JP); Yuki Inoue, Aizuwakamatsu (JP); Kiyotaka Nakaya, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 15/505,174

(22) PCT Filed: Aug. 18, 2015

(86) PCT No.: PCT/JP2015/073132
§ 371 (c)(1),
(2) Date: Feb. 20, 2017

(87) PCT Pub. No.: WO2016/039089
PCT Pub. Date: Mar. 17, 2016

(65) Prior Publication Data
US 2017/0298527 A1    Oct. 19, 2017

(30) Foreign Application Priority Data

Sep. 11, 2014    (JP) .................................. 2014-185033

(51) Int. Cl.
*C25D 5/12*    (2006.01)
*C25D 5/50*    (2006.01)
(Continued)

(52) U.S. Cl.
CPC ................ *C25D 5/12* (2013.01); *B32B 15/01* (2013.01); *C22C 13/00* (2013.01); *C23C 18/16* (2013.01);
(Continued)

(58) Field of Classification Search
CPC ... C25D 5/12; C25D 5/50; C25D 7/00; C25D 3/30; C25D 3/12; C25D 5/505;
(Continued)

(56) References Cited

U.S. PATENT DOCUMENTS

| 8,940,405 B2 | 1/2015 | Masago et al. |
| 2011/0236712 A1 | 9/2011 | Masago et al. |

(Continued)

FOREIGN PATENT DOCUMENTS

| EP | 2351875 A1 | 8/2011 |
| EP | 2843086 A2 | 3/2015 |

(Continued)

OTHER PUBLICATIONS

International Search Report dated Nov. 17, 2015, issued for PCT/JP2015/073132.

(Continued)

*Primary Examiner* — Michael E. La Villa
(74) *Attorney, Agent, or Firm* — Locke Lord LLP; James E. Armstrong, IV; Nicholas J. DiCeglie, Jr.

(57) ABSTRACT

A tin-plated copper alloy terminal material in which an Sn-based surface layer is formed on a surface of a base material that is made of copper or a copper alloy, and a Cu—Sn alloy layer and an Ni layer or an Ni alloy layer are sequentially formed between the Sn-based surface layer and the base material from the Sn-based surface layer side: the Cu—Sn alloy layer is a layer that is formed only of an intermetallic compound alloy which is obtained by substituting some of Cu in $Cu_6Sn_5$ alloy with Ni; and parts of the Cu—Sn alloy layer are exposed from the Sn-based surface layer, thereby forming a plurality of exposed portions; an average thickness of the Sn-based surface layer is from 0.2

(Continued)

µm to 0.6 µm (inclusive); and an area rate of the exposed portions of the Cu—Sn alloy layer relative to a surface area of is 1% to 40% (inclusive).

2 Claims, 7 Drawing Sheets

(51) Int. Cl.
    *C25D 3/12*     (2006.01)
    *C25D 3/30*     (2006.01)
    *C25D 3/38*     (2006.01)
    *B32B 15/01*     (2006.01)
    *C22C 13/00*     (2006.01)
    *H01R 13/03*     (2006.01)
    *C23C 28/02*     (2006.01)
    *C23C 18/16*     (2006.01)
    *C23C 30/00*     (2006.01)
    *H01R 13/04*     (2006.01)
    *H01R 13/02*     (2006.01)

(52) U.S. Cl.
    CPC .......... *C23C 28/021* (2013.01); *C23C 28/023* (2013.01); *C23C 30/00* (2013.01); *C23C 30/005* (2013.01); *C25D 5/50* (2013.01); *C25D 5/505* (2013.01); *H01R 13/02* (2013.01); *H01R 13/03* (2013.01); *H01R 13/04* (2013.01); *B32B 2311/12* (2013.01); *B32B 2311/16* (2013.01); *B32B 2457/00* (2013.01); *C25D 3/12* (2013.01); *C25D 3/30* (2013.01); *C25D 3/38* (2013.01); *Y10T 428/1291* (2015.01); *Y10T 428/12708* (2015.01); *Y10T 428/12715* (2015.01); *Y10T 428/12722* (2015.01); *Y10T 428/12882* (2015.01); *Y10T 428/12903* (2015.01); *Y10T 428/12931* (2015.01); *Y10T 428/12944* (2015.01); *Y10T 428/12993* (2015.01); *Y10T 428/2495* (2015.01); *Y10T 428/24967* (2015.01); *Y10T 428/24975* (2015.01); *Y10T 428/264* (2015.01); *Y10T 428/265* (2015.01); *Y10T 428/273* (2015.01)

(58) Field of Classification Search
    CPC ...... C25D 7/0607; C25D 7/0614; C25D 3/38; C25D 5/10; C25D 5/16; C25D 5/34; C25D 5/48; C25D 7/06; H01R 13/03; H01R 13/02; H01R 13/04; B32B 15/01; B32B 15/04; B32B 15/043; B32B 2311/16; B32B 2457/00; B32B 2311/12; C22C 13/00; C22C 19/00; C22C 19/002; C22C 19/03; C22C 9/02; C22C 9/06; C23C 30/00; C23C 30/005; C23C 28/021; C23C 28/023; C23C 18/16; C23C 18/1633; C23C 18/1635; C23C 18/1646; C23C 18/165; C23C 18/32; C23C 18/38; C23C 18/50; C23C 18/31; C23C 18/54; C23C 18/1651; C23C 18/1653; C23C 18/1664; C23C 18/1689; C23C 18/1692; C23C 18/1698; Y10T 428/12708; Y10T 428/12715; Y10T 428/12722; Y10T 428/12882; Y10T 428/12903; Y10T 428/1291; Y10T 428/12931; Y10T 428/12944; Y10T 428/12993; Y10T 428/2495; Y10T 428/24967; Y10T 428/24975; Y10T 428/264; Y10T 428/265; Y10T 428/273
See application file for complete search history.

(56) References Cited

U.S. PATENT DOCUMENTS

| | | |
|---|---|---|
| 2011/0266035 A1 | 11/2011 | Sakurai et al. |
| 2013/0196171 A1 | 8/2013 | Taninouchi et al. |
| 2014/0004373 A1 | 1/2014 | Taninouchi et al. |
| 2014/0041219 A1 | 2/2014 | Masago et al. |
| 2014/0134457 A1 | 5/2014 | Sakurai et al. |
| 2014/0170436 A1 | 6/2014 | Taninouchi et al. |
| 2014/0295070 A1 | 10/2014 | Tsuru |

FOREIGN PATENT DOCUMENTS

| | | |
|---|---|---|
| EP | 2896724 A1 | 7/2015 |
| JP | 2007-063624 A | 3/2007 |
| JP | 2007-100220 A | 4/2007 |
| JP | 4319247 B1 | 8/2009 |
| JP | 2010-168598 A | 8/2010 |
| JP | 2011-026677 A | 2/2011 |
| JP | 2011-063875 A | 3/2011 |
| JP | 2011-204617 A | 10/2011 |
| JP | 2013-174006 A | 9/2013 |
| JP | 2013-174008 A | 9/2013 |
| JP | 2013-213249 A | 10/2013 |
| JP | 5522300 B1 | 6/2014 |
| JP | 2014-208904 A | 11/2014 |

OTHER PUBLICATIONS

Extended European Search Report issued in corresponding European Patent Application No. 15840443.4 dated Apr. 6, 2018.

TIN-PLATED COPPER-ALLOY TERMINAL MATERIAL

BACKGROUND OF THE INVENTION

Technical Field

The present invention relates to a tin-plated copper-alloy terminal material and producing method thereof useful as a connector terminal for connecting electrical wiring of automobiles, personal products and the like, particularly a terminal for a multi-pin connector.

Priority is claimed on Japanese Patent Application No. 2014-185033, filed Sep. 11, 2014, the content of which is incorporated herein by reference.

Background Art

A tin-plated copper-alloy terminal material is one in which a Cu—Sn alloy layer is formed as an under layer of an Sn-based surface layer in a surface layer by copper plating and tin plating, and then reflowing on a base material made of a copper alloy; and is broadly used as terminal material.

Recently, electrification is rapidly advanced for automobiles for example, so that a number of circuits of an electric device is increased; and in connectors size is miniaturized and pins are increased remarkably. When a number of the pins of the connectors are increased, the connectors need to be inserted with larger force even though insertion force per single pin is small; so that productivity may be deteriorated. Accordingly, it is attempted to decrease the insertion force per single pin by decreasing coefficient of friction of a tin-plated copper alloy material.

For example, a surface exposure rate of the Cu—Sn alloy layer is controlled by roughening the base material (in Patent Document 1). However, there were problems of increment of contact resistance, deterioration of soldering wettability, and the like. If an average of surface roughness of the Cu—Sn alloy layer was controlled (in Patent Document 2), there was a problem in which coefficient of kinetic friction could not be decreased to 0.3 or less in order to further improve insertion/extraction performance, for example.

A layer structure of a material/Ni/CuSn/Sn was formed by nickel plating, copper plating, and tin plating in a sequence and then reflowing on the base material (in Patent Document 3). However, it was an object to prevent deterioration of contact resistance when heating; so that the coefficient of kinetic friction could not be decreased to 0.3 or less.

Here, when P is a force of a female terminal pressing a male terminal (a contact pressure) and $\mu$ is coefficient of kinetic friction, an insertion force F of the connector is obtained as $F=2\times\mu\times P$ since the male terminal is usually pressed by the female terminal from top and bottom. In order to reduce the insertion force F, it is effective to reduce the contact pressure P. However, it is not possible to excessively reduce the contact pressure P because electrical connection reliability between the male/female terminals should be maintained when connecting the connectors, the contact pressure P is necessary to be 3 N or more. Although 50-pins or more per connector is probable in a multi-pin connector, it is desirable that the insertion force F of the connectors be 100 N or smaller, 80 N or smaller if possible, or 70 N or smaller; so that the coefficient of kinetic friction $\mu$ is necessary to be 0.3 or less.

CITATION LIST

Patent Literature

Patent Document 1: Japanese Unexamined Patent Application, First Publication No. 2007-100220

Patent Document 2: Japanese Unexamined Patent Application, First Publication No. 2007-63624

Patent Document 3: Japanese Examined Patent Application, Publication No. 4319247 636324

SUMMARY OF INVENTION

Technical Problem

Terminal material in which the friction resistance on the surface is reduced than a past is developed. In a case of connector terminals in which the male/female terminals are connected, there are not so many cases in which both the terminals are made of the same material; especially for the male terminal, tin-plated terminal material including brass as a base material is broadly used for general purpose. Accordingly, there was a problem in which the effect of reducing the insertion force was small even though only the female terminal is made of low-insertion force terminal material.

The present invention is achieved in consideration of the above circumstances, and has an object to provide a tin-plated copper alloy terminal material which can reduce the insertion force of connecting even for a terminal made of tin plated terminal material for general purpose.

Solution to Problem

As a result of keen study, the inventors discovered that in order to reduce the coefficient of kinetic friction, it is advantageous that a Sn layer in a surface layer be thin and a part of a Cu—Sn alloy layer in an under layer be slightly exposed at a surface of the Sn layer. However, the electrical connection characteristic is deteriorated if the Sn layer is thinner. Then the inventors also found that if the Cu—Sn alloy layer has precipitous asperity and the Sn layer and the Cu—Sn alloy layer form a composite structure in the vicinity of the surface layer, the electrical connection characteristic can be prevented from deteriorating by restricting the exposure of the Cu—Sn alloy layer to limited areas and the coefficient of kinetic friction is decreased because soft Sn between the hard Cu—Sn alloy layer acts as lubricant, so that terminal material with low insertion force can be obtained. However, when this terminal material with low insertion force was used only for one of the terminals and the other is made of tin-plated material for general purpose, the effect of reduction of the friction coefficient was deteriorated by half. This is because the hard Cu—Sn alloy layer forms projections by a difference in level between the exposed Cu—Sn alloy layer and the Sn layer in the terminal material with low insertion force, so that the tin-plated material for general purpose is scraped at the soft Sn-based surface layer, and so-called abrasive wear is occurred. Gaining this insight, solution to problem was obtained as below.

A tin-plated copper alloy terminal material according to the present invention is a material in which a Sn-based surface layer is formed on a surface of a base material made of copper or a copper alloy, and a Cu—Sn alloy layer/an Ni layer or Ni copper layer are formed from the Sn-based surface layer in a sequence, the Cu—Sn alloy layer consists of an intermetallic compound alloy which is obtained by substituting some of Cu in $Cu_6Sn_5$ alloy with Ni, parts of the Cu—Sn alloy layer are exposed from the Sn-based surface layer and form exposed portions, an average thickness of the Sn-based surface layer is 0.2 μm or larger and 0.6 μm or smaller, an area rate of the exposed portions of the Cu—Sn alloy layer relative to a surface area of in a surface layer of the tin-plated copper alloy terminal material is 1% or higher and 40% or lower, an average circle-equivalent diameter of the exposed portions of the Cu—Sn alloy layer is 0.1 μm or larger and 1.5 μm or smaller, a reduced peak height Rpk at a surface of the tin-plated copper alloy terminal material is 0.005 μm or larger and 0.03 μm or smaller, and coefficient of kinetic friction is 0.3 or less.

Since the reduced peak height Rpk of the surface of the tin-plated copper alloy terminal material is 0.005 μm or more and 0.03 μm or less, the average thickness of the Sn-based surface layer is 0.2 μm or more and 0.6 μm or less, the area rate of the exposed portions of the Cu—Sn alloy layer relative to the surface area of the surface layer of the tin-plated copper alloy terminal material is 1 to 40%, and the average circle-equivalent diameter of the exposed portions of the Cu—Sn alloy layer is 0.1 μm or more and 1.5 μm or less; the coefficient of kinetic friction of the tin-plated copper alloy material can be 0.3 or less. In this case, there exists $(Cu, Ni)_6Sn_5$ alloy which is obtained by substituting some of Cu with Ni, so that a surface of the Cu—Sn alloy layer has fine roughness, and the reduced peak height Rpk of the tin-plated terminal material and the area rate of the exposed portions of the Cu—Sn alloy layer are controlled in prescribed ranges.

The reduced peak height Rpk of the surface of the tin-plated copper alloy terminal material is set to 0.03 μm or less for the reason that if it exceeds 0.03 μm, the hard Cu—Sn alloy layer scrapes the soft Sn layer of an opposite material so that the so-called abrasive wear is occurred and the frictional resistance is large. The reduced peak height Rpk of the tin-plated copper alloy material is set to 0.005 μm or more for the reason that a difference in level is generated between the Sn-based surface layer and the exposed portions of the Cu—Sn alloy layer if the Cu—Sn alloy layer is exposed at the surface of the Sn-based surface layer.

The reason to set the average thickness of the Sn-based surface layer to 0.2 μm or more and 0.6 μm or less is that the soldering wettability and the electrical connection reliability may be deteriorated if it is less than 0.2 μm, and the coefficient of kinetic friction may be increased if it exceeds 0.6 μm because the surface layer is not formed to be a composite structure of the Sn layer and the Cu—Sn alloy layer and occupied only by Sn. It is more desirable for the average thickness of the Sn-based surface layer to be 0.3 to 0.5 μm.

If the aria rate of the exposed portions of the Cu—Sn alloy layer relative to the surface area of the tin-plated copper alloy terminal material is less than 1%, the coefficient of kinetic friction cannot be reduced to 0.3 or less: if it exceeds 40%, the electrical connection characteristic such as the soldering wettability is deteriorated. It is more desirable for the area rate to be 2% to 20%.

If the average circle-equivalent diameter of the exposed portions of the Cu—Sn alloy layer is smaller than 0.1 μm, the area rate of the exposed portions of the Cu—Sn alloy layer cannot be 1% or larger: if it exceeds 1.5 μm, the coefficient of kinetic friction cannot be reduced to 0.3 or less since the soft Sn between the hard Cu—Sn alloy layer cannot act enough as lubricant. It is more desirable for the circle-equivalent diameter to be 0.2 μm to 1.0 μm.

It is known that the coefficient of kinetic friction of the Sn-based surface layer is increased when vertical load for measuring the coefficient of kinetic friction is reduced. However, according to the present invention, the coefficient of kinetic friction is hardly changed even though the vertical load is reduced, so that the effect can be obtained even when used for a small terminal.

In the tin-plated copper alloy terminal material of the present invention, it is desirable that a content percentage of Ni in the Cu—Sn alloy layer be 1 at % or more and 25 at % or less. The content percentage of Ni is set to 1 at % or more for the reason that if it is less than 1 at % the intermetallic compound alloy in which some of Cu in $Cu_6Sn_5$ alloy is substituted with Ni cannot be generated and precipitous asperity cannot be formed: it is set to 25 at % or less for the reason that if it exceeds 25 at % shape of the Cu—Sn alloy layer tends to be too minute. There is a case in which the coefficient of kinetic friction is not reduced to 0.3 or less if the Cu—Sn alloy layer is too minute.

The producing method of a tin-plated copper alloy terminal material of the present invention is a method in which on a base material made of copper alloy, performing a nickel plating step or a nickel alloy plating step, a copper plating step, and a tin plating step in this sequence, and then performing a reflowing process, so that an Ni layer or an Ni alloy layer/a Cu—Sn alloy layer/an Sn-based surface layer are formed on the base material, the method in which a first plated layer thickness by the nickel plating step or the nickel alloy plating step is 0.05 μm or more and 1.0 μm or less, a second plated layer thickness by the copper plating step is 0.05 μm or more and 0.20 μm or less, a third plated layer thickness by the tin plating step is 0.5 μm or more and 1.0 μm or less, and the reflowing process includes a heating step heating the respective plated layers to a peak temperature of 240 to 300° C. at a temperature rise rate of 20 to 75° C./second, a first cooling step cooling the respective plated layers at a cooling rate less than 30° C./second for 2 to 15 seconds after reaching the peak temperature, and a second cooling step cooling at a cooling rate of 100 to 300° C./second after the first cooling step.

As mentioned above, by performing the nickel plating step or the nickel alloy plating on the base material, it is possible to generate $(Cu, Ni)_6Sn_5$ alloy after the reflowing process and make the Cu—Sn alloy layer precipitously, so that the coefficient of kinetic friction can be reduced to 0.3 or less.

If the first plated layer thickness by the nickel plating step or the nickel alloy plating step is less than 0.05 μm, the Ni content percentage in $(Cu, Ni)_6Sn_5$ alloy is small and the Cu—Sn alloy layer having precipitous asperity is not generated: if it exceeds 1.0 μm, it is difficult to perform bending. In order to improve heat-resistance property by making the Ni layer or the Ni alloy layer an obstruction layer which obstruct spread of Cu from the base material, it is desirable that the first plated layer thickness by the nickel plating step or the nickel alloy plating step be 0.1 μm or more. The metal for the nickel plating step or the nickel alloy plating step is not limited to pure Ni, it may be Ni alloy such as Ni—Co, Ni—W, or the like.

If the second plated layer thickness by the copper plating step is less than 0.05 μm, the Ni content percentage in $(Cu, Ni)_6Sn_5$ alloy is large and the asperity of the Cu—Sn alloy layer is too minute: if it exceeds 0.20 μm, the Ni content percentage in $(Cu, Ni)_6Sn_5$ is small and the Cu—Sn alloy layer with the precipitous asperity cannot be generated.

If the third plated layer thickness by the tin plating step is less than 0.5 μm, the Sn-based surface layer after the reflowing process is thin, so the electrical connection property is deteriorated: if it exceeds 1.0 μm, the area rate of the exposed portions of the Cu—Sn alloy layer at the surface of the Sn-based surface layer is small, so the coefficient of kinetic friction is hard to be reduced to 0.3 or less.

In the reflowing process, if the temperature rise rate is less than 20° C./second in the heating step, the Cu—Sn alloy layer having the precipitous asperity cannot be generated because Cu atoms spread into grain boundary of Sn with precedence before the tin plating is melted so that the intermetallic compound is abnormally grown in the vicinity of the grain boundary. Meanwhile, if the temperature rise rate exceeds 75° C./second, the growth of the intermetallic compound is not sufficient, so the desired intermetallic compound alloy cannot be obtained in the subsequent cooling step.

If the peak temperature in the heating step is less than 240° C., Sn is not melted uniformly. If the peak temperature exceeds 300° C., the asperity of the Cu—Sn alloy layer is undesirably large because the intermetallic compound grows drastically.

In the cooling steps, since the cooling rate is small in the first cooling step, the Cu atoms spread mildly into the Sn grains so as to grow with the desired intermetallic compound structure. If the cooling rate in the first cooling step exceeds 30° C./second, the intermetallic compound cannot grow sufficiently owing to rapid cooling, so that the Cu—Sn alloy layer is not exposed on the surface. Similarly, the intermetallic compound cannot grow when the cooling time is less than 2 seconds. If the cooling time exceeds 15 seconds, Cu6Sn5 alloy grows excessively to be coarse, so that a barrier property of the Ni layer is deteriorated because an Ni—Sn compound layer is generated under the Cu—Sn alloy layer according to the thickness of the copper plated layer. Air cooling is suitable for the first cooling step.

After the first cooling step, the growth of the intermetallic compound alloy is completed at a desired structure by rapid cooling of the second cooling step. If the cooling rate in the second cooling step is less than 100° C./second, the desired intermetallic compound form cannot be obtained because the growth of the intermetallic compound further advances.

Advantageous Effects of Invention

According to the present invention, since the coefficient of kinetic friction is small, the low contact resistance, the good soldering wettability, and the low insertion/extraction performance can be obtained together, and it is possible to provide the tin-plated copper alloy terminal material effective even for low load and suitable for a small terminal. Particularly, in terminals for automobiles, electronic component and the like, it has superiority at positions in which low insertion force for connecting, steady contact resistance, and good soldering wettability are necessary.

DESCRIPTION OF EMBODIMENTS

A tin-plated copper alloy terminal material of an embodiment according to the present invention will be explained.

The tin-plated copper alloy terminal material of this embodiment has a base material made of copper or copper alloy and an Sn-based surface layer formed on a surface of the base material. Between the Sn-based surface layer and the base material, a Cu—Sn alloy layer/an Ni layer or an Ni alloy layer are formed in this sequence from the Sn-based surface layer.

The base material is not limited in composition but made of copper or copper alloy.

The Ni layer or the Ni alloy layer is made of pure Ni or Ni alloy such as Ni—Co, Ni—W or the like.

The Cu—Sn alloy layer consists of an intermetallic compound alloy which is obtained by substituting some of Cu in $Cu_6Sn_5$ alloy with Ni, parts of the Cu—Sn alloy layer are exposed at a surface of the Sn-based surface layer and form exposed portions.

These layers are, as described later, formed by performing a nickel plating step, a copper plating step, and a tin plating step on the base material in this sequence, and then performing a reflowing process. On the Ni layer or the Ni alloy layer, the Cu—Sn alloy layer is formed.

In this tin-plated copper alloy terminal material, it is important that the Cu—Sn alloy layer exposed at the surface is minute and difference in level between Cu—Sn alloy layer and the Sn-based surface layer is small and smooth. A surface of the tin-plated copper alloy terminal material formed by the exposed portions of the Cu—Sn alloy layer and the Sn-based surface layer has a reduced peak height Rpk of 0.005 μm or more and 0.03 μm or less. The reduced peak height Rpk is an average height of "reduced peaks" over a roughness core profile, defined by JIS B 0671-2 (Japanese Industrial Standards), and can be obtained by measuring by a laser microscope.

An average thickness of the Sn-based surface layer is 0.2 μm or more and 0.6 μm or less. Parts of the Cu—Sn alloy layer (exposed portions) are exposed from a surface of the Sn-based surface layer. An area rate of the exposed portions relative to a surface area of the tin-plated copper alloy terminal material is 1% or more and 40% or less. An average circle-equivalent diameter of the exposed portions of the Cu—Sn alloy layer is 0.1 μm or more and 1.5 μm or less.

In the tin-plated copper alloy terminal material having the above-mentioned structure, owing to existence of the Cu—Sn alloy layer that is made only of $(Cu, Ni)_6Sn_5$ in which some of Cu is substituted with Ni, the surface layer is a composite structure of the hard Cu—Sn alloy layer and the soft Sn-based surface layer. The parts of the hard Cu—Sn alloy layer (the exposed portions) are exposed a little from the Sn-based surface layer and make a lot of the exposed portions. Soft Sn exists around every exposed portion and acts as lubricant, so that the low coefficient of kinetic friction of 0.3 or less can be obtained. The area rate of the exposed portions of the Cu—Sn alloy layer is in a limited range of 1% or more and 40% or less of the surface area of the tin-plated copper alloy terminal material. Accordingly, the excellent electrical connection characteristic of the Sn-based surface layer is not deteriorated.

In this case, the Ni content percentage in the Cu—Sn alloy layer is 1 at % or more and 25 at % or less. The Ni content percentage is set to 1 at % or more for the reason that the intermetallic compound alloy in which some of Cu in Cu6Sn5 alloy is substituted with Ni is not generated when it is less than 1 at % and the precipitous asperity is not formed. The Ni content percentage is set to 25 at % or less for the reason that shape of the Cu—Sn alloy layer tends to be too minute when it exceeds 25 at %. If the Cu—Sn alloy layer is too minute, there is a case of the coefficient of kinetic friction cannot be reduced to 0.3 or less.

The average thickness of the Sn-based surface layer is 0.2 μm or more and 0.6 μm or less for the reason that the soldering wettability and the electronic connection reliability may be deteriorated when it is less than 0.2 μm: and if it exceeds 0.6 μm the surface layer is not the composite structure of the Sn layer and the Cu—Sn alloy layer and occupied by tin, so the coefficient of kinetic friction is increased. It is more desirable to be 0.3 μm to 0.5 μm for the average thickness of the Sn-based surface layer.

If the area rate of the exposed portions of the Cu—Sn alloy layer at the surface of the terminal material is less than 1%, the coefficient of kinetic friction cannot be reduced to 0.3 or less: if it exceeds 40%, the electronic connection characteristic such as the soldering wettability and the like is deteriorated. It is more desirable to be 2% to 20% for the area rate.

If the average circle-equivalent diameter of the exposed portions of the Cu—Sn alloy layer is less than 0.1 μm, the area rate of the exposed portions cannot be 1% or more: if it exceeds 1.5 μm, the soft tin between the hard Cu—Sn alloy layer cannot act sufficiently as lubricant, so the coefficient of kinetic friction cannot be reduced to 0.3 or less. It is more desirable to be 0.2 μm to 1.0 μm for the circle-equivalent diameter.

In the Sn-based surface layer, it is known that the coefficient of kinetic friction is increased when the vertical load for measuring the coefficient of kinetic friction is small. However, according to the present invention, the coefficient of kinetic friction hardly changes even if the vertical load is decreased, and the effect can be sufficiently obtained even for a small terminal Next, a producing method of this terminal material will be explained.

As the base material, a plate material made of copper or copper alloy such as Cu—Ni—Si based alloy or the like is prepared. Purifying a surface of the plate material by degreasing, acid cleaning and the like, then a nickel plating step, a copper plating step, and a tin plating step are performed in this sequence.

For the nickel plating step, a standard nickel plating bath can be used; for example, a sulfate bath including sulfuric acid ($H_2SO_4$) and nickel sulfate ($NiSO_4$) as main ingredient can be used. Temperature of the plating bath is 20° C. or more and 50° C. or less. Current density is 1 to 30 A/dm$^2$. A film thickness of the nickel plated layer (a first plated layer thickness) made by this nickel plating step is 0.05 μm or more and 1.0 μm or less. If the first plated layer thickness is less than 0.05 μm, the Ni content percentage in (Cu, Ni)$_6$Sn$_5$ alloy is small, and the Cu—Sn alloy layer having the precipitous asperity cannot be generated. If the first plated layer thickness exceeds 1.0 μm, it is difficult to perform the bending work or the like.

For the copper plating step, a standard copper plating bath can be used; for example, a copper sulfate plating bath including copper sulfate ($CuSO_4$) and sulfuric acid ($H_2SO_4$) as main ingredient can be used. Temperature of the plating bath is 20° C. or more and 50° C. or less. Current density is 1 to 30 A/dm$^2$. A film thickness of the copper plated layer (a second plated layer thickness) made by this copper plating step is 0.05 μm or more and 0.20 μm or less. If the second plated layer thickness is less than 0.05 μm, the Ni content percentage in (Cu, Ni)$_6$Sn$_5$ alloy is increased, so that the Cu—Sn alloy layer is to minute. If the second plated layer thickness exceeds 0.20 μm, the Ni content percentage in (Cu, Ni)$_6$Sn$_5$ alloy is decreased, so that the Cu—Sn alloy layer having the precipitous asperity is not generated.

For a plating bath for forming the tin plated layer, a standard tin plating bath can be used; for example, a sulfate bath including sulfuric acid ($H_2SO_4$) and stannous sulfate ($SnSO_4$) as main ingredient can be used. Temperature of the plating bath is 15 to 35° C. Current density is 1 to 30 A/dm$^2$. A film thickness of the tin plated layer (a third plated layer thickness) made by this tin plating step is 0.5 μm or more and 1.0 μm or less. If the third plated layer thickness is less than 0.5 μm, the Sn-based surface layer after the reflowing process is thin, so that the electronic connection characteristic is deteriorated. If the third plated layer thickness exceeds 1.0 μm, the area rate of the exposed portions of the Cu—Sn alloy layer at the surface of the terminal material is decreased, so it is difficult to reduce the coefficient of kinetic friction to 0.3 or less.

After these plating steps, a reflowing process with heating is performed.

The reflowing process is a process in a heating furnace with CO reducing atmosphere; including a heating step heating the treated material after plating (the base material) to a peak temperature of 240 to 300° C. at a temperature rise rate of 20 to 75° C./second, a first cooling step cooling it at a cooling rate less than 30° C./second for 2 to 15 seconds after reaching the peak temperature, and a second cooling step cooling at a cooling rate of 100 to 300° C./second after the first cooling step. The first cooling step is performed by air cooling. The second cooling step is performed by water cooling using water of 10 to 90° C.

By performing this reflowing process in the reducing atmosphere, tin oxid film having higher melting temperature is prevented from generating on a surface of the tin plating, it is possible to perform the reflow process with lower temperature and shorter time, and it is easy to make desired intermetallic compound structure. Since the cooling steps are two steps so that the cooling rate is small in the first cooling step, Cu atoms are mildly spread into the Sn grains and the desired intermetallic compound structure grows. Then, by rapidly cooling, the growth of the intermetallic compound alloy is stopped, and the desired structure can be stabilized.

Cu and Sn by electrodeposition with high current density have low stability, so that they are alloyed or crystal grains are grown even in room temperature: accordingly, it is difficult to form the desired intermetallic compound structure by the reflowing process. Therefore, it is desirable to perform the reflowing process soon after the plating steps. Specifically, it is necessary to perform the reflowing within 15 minutes, desirably within 5 minutes. A leaving time after plating is not a matter when it is short, but will be about 1 minute in a standard processing structure.

EXAMPLES (Female Terminal Test Pieces)

Test materials for female terminal test pieces were made by performing the nickel plating step, the copper plating step and the tin plating step in this sequence on a base material which was a Corson copper alloy plate (Cu—Ni—Si based alloy) of a plate thickness 0.25 mm, and then performing the reflowing process. Plating conditions for the nickel plating step, the copper plating step and the tin plating step were the same in Examples and Comparative Examples, as shown in Table 1. In Table 1, Dk is an abbreviation of current density of a cathode; and ASD is an abbreviation of A/dm$^2$.

TABLE 1

|  | Nickel Plating |  | Cupper Plating |  | Tin Plating |  |
|---|---|---|---|---|---|---|
| Composition of Plating Solution | Nickel Sulfate Sulfuric Acid | 300 g/L 2 g/L | Cupper Sulfate Sulfuric Acid | 250 g/L 50 g/L | Tin Sulfate Sulfuric Acid Additive | 75 g/L 85 g/L 10 g/L |
| Solution Temperature | 45° C. |  | 25° C. |  | 25° C. |  |
| Dk | 5 ASD |  | 5 ASD |  | 2 ASD |  |

The reflowing process after the plating steps was performed 1 minute after the last tin plating step on various conditions for the heating step, the first cooling step and the second cooling steps. The respective test conditions and thicknesses of the test materials were shown in Table 2.

(SFT9400) made by SII Nano Technology Inc. First, with respect to each of the test materials after reflowing, a whole thickness of the Sn-surface layer was measured at first. Then, the Sn-based surface layer was removed by soaking in etching solution for removing plating coating for a few minutes, e.g., L80 made by Leybold Co., Ltd. or the like, that etches pure Sn but does not erode the Cu—Sn alloy layer. The under Cu—Sn alloy layer was exposed so that the thickness thereof was measured converting into pure Sn. The thickness of the Sn-based surface layer was defined by (the whole thickness of the Sn-based surface layer) minus (the thickness of the Cu—Sn alloy layer converted into pure Sn).

In the Cu—Sn alloy layer, with respect to the Ni content percentage in (Cu, Ni)$_6$Sn$_5$ alloy, positions of alloy were specified by observation of sectional STEM images and area analysis of EDS analysis: and the Ni content percentage in (Cu, Ni)$_6$Sn$_5$ alloy was obtained by point analysis. With

TABLE 2

|  |  | PLATED LAYER THICKNESS (μm) |  |  | HEATING |  | 1st COOLING |  | 2nd COOLING |
|---|---|---|---|---|---|---|---|---|---|
|  |  | Ni | Cu | Sn | RATE (° C./sec) | PEAK TEMPERATURE | RATE (° C./sec) | TIME (second) | RATE (° C./sec) |
| Examples | 1 | 0.3 | 0.05 | 0.5 | 40 | 240 | 30 | 2 | 250 |
|  | 2 | 0.3 | 0.1 | 0.8 | 40 | 270 | 20 | 5 | 170 |
|  | 3 | 0.3 | 0.15 | 0.8 | 40 | 270 | 20 | 5 | 170 |
|  | 4 | 0.3 | 0.2 | 0.8 | 40 | 300 | 20 | 5 | 170 |
|  | 5 | 0.05 | 0.1 | 0.6 | 75 | 270 | 20 | 5 | 170 |
|  | 6 | 0.05 | 0.15 | 1.0 | 20 | 270 | 10 | 15 | 300 |
|  | 7 | 0.1 | 0.2 | 0.7 | 40 | 270 | 20 | 5 | 100 |
|  | 8 | 0.3 | 0.2 | 0.6 | 40 | 270 | 30 | 2 | 170 |
| Comparative Examples | 1 | 0.02 | 0.15 | 0.8 | 40 | 270 | 20 | 5 | 170 |
|  | 2 | 0.3 | 0.2 | 0.4 | 40 | 270 | 20 | 5 | 170 |
|  | 3 | 0.3 | 0.03 | 0.8 | 40 | 270 | 20 | 5 | 170 |
|  | 4 | 0.3 | 0.3 | 0.8 | 40 | 270 | 20 | 5 | 170 |
|  | 5 | 0.3 | 0.15 | 1.2 | 40 | 270 | 20 | 5 | 170 |
|  | 6 | 0.3 | 0.2 | 0.6 | 15 | 270 | 20 | 5 | 170 |
|  | 7 | 0.3 | 0.2 | 1.0 | 80 | 270 | 20 | 5 | 170 |
|  | 8 | 0.3 | 0.15 | 0.6 | 40 | 310 | 20 | 5 | 170 |
|  | 9 | 0.3 | 0.2 | 1.0 | 40 | 240 | 40 | 2 | 170 |
|  | 10 | 0.3 | 0.15 | 0.8 | 40 | 270 | 10 | 17 | 170 |
|  | 11 | 0.3 | 0.15 | 0.5 | 40 | 270 | 15 | 10 | 90 |
|  | 12 | 0.3 | 0.2 | 1.0 | 40 | 270 | 30 | 2 | 320 |

With respect to these test materials after reflowing, the average thickness of the Sn-based surface layer, the Ni content percentage in (Cu, Ni)$_6$Sn$_5$ alloy, the existence of an alloy layer other than Cu$_6$Sn$_5$, the reduced peak height Rpk, the area rate of the exposed portions of the Cu—Sn alloy layer at the Sn-based surface layer, the average circle-equivalent diameter of the exposed portions were measured; and the coefficient of kinetic friction, the soldering wettability, glossiness, the electronic reliability (the contact resistance) were evaluated.

The thicknesses of the Sn-based surface layer were measured by the fluorescent X-ray coating thickness gauge respect to the existence of an alloy layer other than Cu$_6$Sn$_5$, positions of the alloy was specified by observation of sectional STEM images and area analysis of EDS analysis: and the existence of an alloy layer other than Cu$_6$Sn$_5$ alloy was determined by linear analysis along a depth direction. The existence of an alloy layer other than Cu$_6$Sn$_5$ in a broader area was determined by, in addition to the sectional observation, measuring a pattern of X-ray diffraction by CuKα rays after exposing the under Cu—Sn alloy layer by removing the Sn-based surface layer by soaking in etching solution for removing tin plated coat. The measurement conditions were as follows.

MPD1880HR made by PANalytical
Bulb: Cu-Kα-ray
Voltage: 45 kV
Current: 40 mA

The reduced peak height Rpk at the surface was obtained by an average Rpk value by measuring 10 points measuring 5 points in a longitudinal direction and 5 points in a short end direction using a laser microscope (VK-X200) made by Keyence Corporation, on a condition at an object lens of magnification 150 (with a measurement field of vision 96 μm×72 μm).

The area rate of the exposed portions and the circle-equivalent diameter of the Cu—Sn alloy layer was obtained by observing an area 100×100 μm by a scanning ion microscope, after removing a surface oxide film. Structurally, $Cu_6Sn_5$ alloy existing in a depth area of about 20 μm from an outermost surface is displayed white. Using image processing software, an area of the white portions was calculated, and a rate of the white area relative to a whole measured area was obtained as the area rate of the exposed portions of the Cu—Sn alloy layer.

Diameters of circles having the same areas as that of the respective exposed portions (the white area) were set as the equivalent-circle diameters, and the average thereof was calculated. In a measurement of a particle-size distribution of particles having irregular shapes, converting a diameter of an observed particle into a diameter of a circle having the same area as that of the observed particle; it is the equivalent-circle diameter, deemed to be a diameter of the particles.

(Male Terminal Test Pieces for Measuring Coefficient of Kinetic Friction)

A test material of a male terminal test pieces was made by performing the copper plating step and the tin plating step in this sequence on a base material which was a copper alloy plate (C2600, Cu:70 mass %-Zn:30 mass %) of a plate thickness 0.25 mm, and then performing the reflowing process. Plating thickness of the Sn-based surface layer after the reflowing process was 0.6 μm. There was no exposure of the Cu—Sn alloy layer.

The coefficient of kinetic friction was measured using this male terminal test piece and the female terminal test pieces made on the conditions shown in Table 2. Simulating contacts between a male terminal and a female terminal of a fitting type connector, plate-shape male terminal test pieces and semi-spherical shape female terminal test pieces were made from the respective test materials. The coefficients of kinetic friction were obtained by measuring frictional forces between the test pieces by a friction-measuring device (μV1000) made by Trinity-Lab inc.

Figure 8:
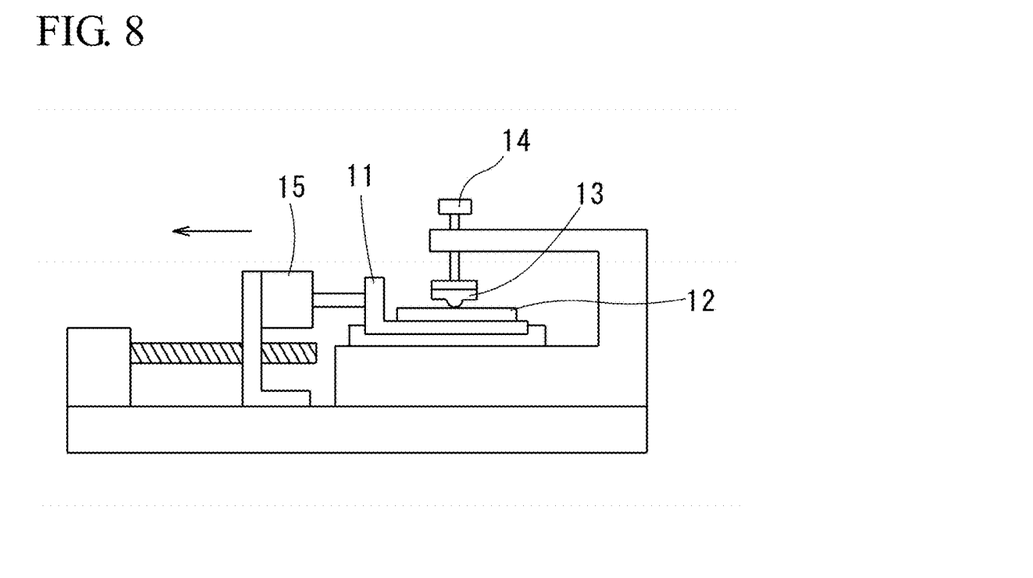
FIG. 8 is a front view conceptually showing a device for measuring a coefficient of kinetic friction.

Explaining with FIG. 8, on a male terminal test piece 12 fixed on a horizontal table 11, a semi-spherical protruded surface of a female terminal test piece 13 was arranged so that the plated surfaces thereof were in contact with each other, and a load P of 500 gf by a weight 14 was applied on the female terminal test piece 13 so as to press the male terminal test piece 12. The male terminal test piece 12 was dragged in the horizontal direction shown by an arrow at a frictional speed of 80 mm/minute for 10 mm in this state in which the load P was applied, a friction force F was measured by a load cell 15. From the load P and an average value Fav of the frictional forces F, the coefficient of kinetic friction (=Fav/P) was obtained.

Regarding the soldering wettability, cutting the test materials into 10 mm width, and zero-crossing time was measured using rosin active flux by the meniscograph method. (The measurement was performed on a condition of soaking in solder of Sn-37% Pb, solder bath temperature 230° C., soaking rate 2 mm/sec, soaking depth 2 mm, soaking time 10 seconds.) It was evaluated as "good" if the solder zero-crossing time was 3 seconds or less, or as "not good" if it exceeded 3 seconds.

The glossiness was measured using a gloss meter (model number: PG-1M) made by Nippon Denshoku Industries Co., LTD., following JIS Z8741, at an incident angle 60°.

In order to evaluate the electric reliability, the contact resistance was measured with heating for 160° C.×500 hours in the air. Following a measuring method of JIS-C-5402, using a four-terminal contact-resistance test device (CRS-113=AU: made by Yamasaki Seiki Institute), and measuring a contact resistance along a variation of the load from 0 to 500 g at a sliding type (1 mm), it was evaluated by the value of the contact resistance at the load 50 g.

Table 3 shows measurement results and evaluation results of these.

TABLE 3

| | | AVERAGE THICKNESS OF Sn-BASED SURFACE LAYER (μm) | Ni CONTENT PERCENTAGE IN $(Cu, Ni)_6Sn_5$ (at %) | ALLOY LAYER OTHER THAN $Cu_6Sn_5$ | REDUCED PEAK HEIGHT Rpk (μm) | AREA RATE OF EXPOSED PORTION OF CuSn (%) | AVERAGE OF EQUIVALENT-CIRCLE DIAMETER OF EXPOSED PORTION OF CuSn (μm) | COEFFICIENT OF KINETIC FRICTION AT LOAD 500 gf | SOLDERING WETTABILITY | GLOSSINESS (×10² GU) | CONTACT RESISTANCE (mΩ) |
|---|---|---|---|---|---|---|---|---|---|---|---|
| EXAMPLE | 1 | 0.21 | 21 | none | 0.029 | 21 | 0.66 | 0.26 | good | 7.5 | 2.15 |
| | 2 | 0.46 | 15 | none | 0.015 | 3 | 0.19 | 0.25 | good | 8.4 | 1.16 |
| | 3 | 0.44 | 10 | none | 0.017 | 11 | 0.38 | 0.23 | good | 8.2 | 1.58 |
| | 4 | 0.42 | 2 | none | 0.019 | 9 | 0.53 | 0.26 | good | 8.3 | 1.39 |
| | 5 | 0.34 | 9 | none | 0.025 | 18 | 0.93 | 0.26 | good | 7.9 | 7.84 |
| | 6 | 0.52 | 11 | none | 0.008 | 1 | 0.12 | 0.29 | good | 8.5 | 5.23 |
| | 7 | 0.34 | 5 | none | 0.023 | 19 | 1.23 | 0.28 | good | 7.6 | 3.96 |
| | 8 | 0.22 | 4 | none | 0.027 | 35 | 1.40 | 0.27 | good | 7.2 | 2.80 |
| COMPARATIVE EXAMPLE | 1 | 0.32 | 0.5 | none | 0.09 | 0.5 | 0.53 | 0.38 | good | 8.5 | 7.88 |
| | 2 | 0.05 | 3 | none | 0.045 | 55 | 2.12 | 0.35 | not good | 6.5 | 14.57 |
| | 3 | 0.65 | 26 | $Ni_3Sn_4$ | 0.011 | 0 | 0 | 0.47 | good | 8.6 | 6.85 |
| | 4 | 0.31 | 0 | $Cu_3Sn$ | 0.007 | 11 | 1.56 | 0.35 | good | 8.3 | 1.89 |
| | 5 | 0.85 | 9 | none | 0.006 | 0 | 0 | 0.49 | good | 8.6 | 0.78 |
| | 6 | 0.16 | 5 | none | 0.041 | 42 | 1.68 | 0.33 | not good | 6.8 | 4.71 |
| | 7 | 0.61 | 3 | none | 0.008 | 0 | 0 | 0.46 | good | 8.6 | 0.85 |
| | 8 | 0.19 | 14 | $Ni_3Sn_4$ | 0.033 | 38 | 1.53 | 0.33 | not good | 6.9 | 8.22 |

TABLE 3-continued

| | AVERAGE THICK-NESS OF Sn-BASED SURFACE LAYER (μm) | Ni CONTENT PER-CENTAGE IN (Cu, Ni)₆Sn₅ (at %) | ALLOY LAYER OTHER THAN Cu₆Sn₅ | RE-DUCED PEAK HEIGHT Rpk (μm) | AREA RATE OF EXPOSED PORTION OF CuSn (%) | AVERAGE OF EQUIVALENT-CIRCLE DIAMETER OF EXPOSED PORTION OF CuSn (μm) | COEF-FICIENT OF KINETIC FRICTION AT LOAD 500 gf | SOL-DERING WETT-ABILITY | GLOSS-INESS (×10² GU) | CONTACT RESIST-ANCE (mΩ) |
|---|---|---|---|---|---|---|---|---|---|---|
| 9  | 0.53 | 0  | none   | 0.006 | 0  | 0    | 0.43 | good     | 8.4 | 1.12 |
| 10 | 0.25 | 22 | Ni₃Sn₄ | 0.019 | 17 | 0.65 | 0.26 | good     | 7.7 | 9.95 |
| 11 | 0.15 | 16 | Ni₃Sn₄ | 0.036 | 49 | 1.87 | 0.34 | not good | 6.7 | 9.18 |
| 12 | 0.56 | 0  | none   | 0.007 | 0  | 0    | 0.44 | good     | 8.5 | 1.03 |

As clearly known from Table 3, in every Examples the coefficient of kinetic friction was small as 0.3 or less, the soldering wettability was good, the glossiness was high and the appearance was good, and the contact resistance was 10 ma or less. Especially, in Examples 1 to 4, 7 and 8 in which the nickel plated layer was formed to have the thickness 0.1 μm or more by the nickel plating step, the contact resistance were low as 4 mΩ or less.

Meanwhile, in Comparative Examples 1, 3, 5, 7, 9 and 12, the coefficient of kinetic friction was 0.3 or more because the area rate of the exposed portions of the Cu—Sn alloy layer was less than 1%. In Comparative Examples 2 and 6, since the area rate of the exposed portions was more than 40%, the soldering wettability and the glossiness were bad. In Comparative Example 4, Ni was not included in Cu₆Sn₅ alloy and Cu₃Sn alloy appeared, so the average of the equivalent-circle diameter of the exposed portions exceeded 1.5 μm: accordingly, the coefficient of kinetic friction was more than 0.3.

In Comparative Examples 8 and 11, it was deviated from the reflowing condition, so that Rpk exceeded 0.03 μm and the abrasive wearing was occurred: as a result, the coefficient of kinetic friction exceeded 0.3. In Comparative Example 10, since it was deviated from the reflowing condition, Ni₃Sn₄ alloy was formed: as a result, the barrier property of the Ni layer was deteriorated and the contact resistance exceeded 9 mΩ.

Figure 1:
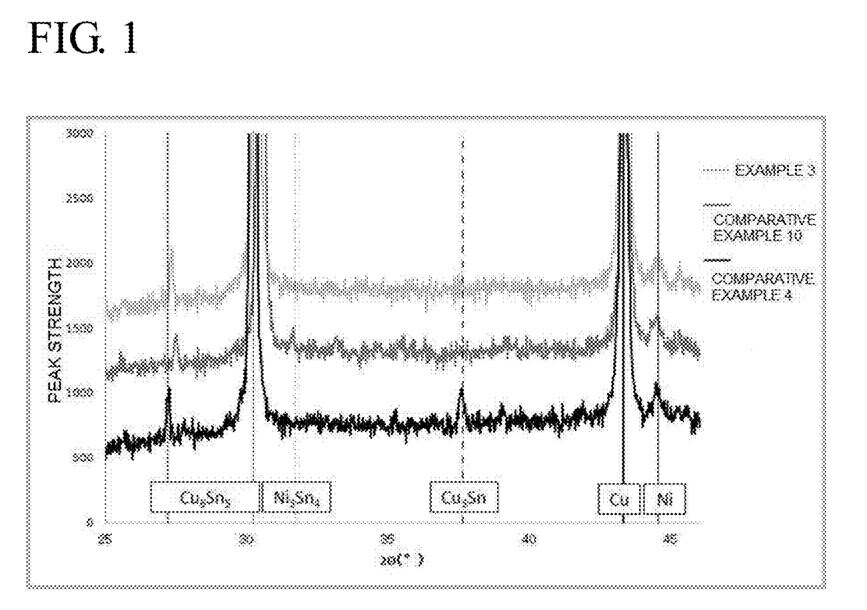
FIG. 1 is a graph showing patterns of X-ray diffraction of Example 3 and Comparative Examples 4 and 10.

FIG. 1 is a pattern of X-ray diffusion from 25° to 36° in Example 3 and Comparative Examples 4 and 10. As know by comparing these patterns, in Example 3, only peaks of Ni and Cu₆Sn₅ alloy in an undercoat plated layer were detected: in Comparative Example 10, a peak of Ni₃Sn₄ alloy was detected around 31.7°: and in Comparative Example 4, a peak of Cu₃Sn alloy was detected around 37.8°. In Example 3 and Comparative Example 10, it was known that some of Cu in Cu₆Sn₅ alloy was substituted with Ni because a peak of Cu₆Sn₅ alloy was shifted to higher angle side.

Figure 2:
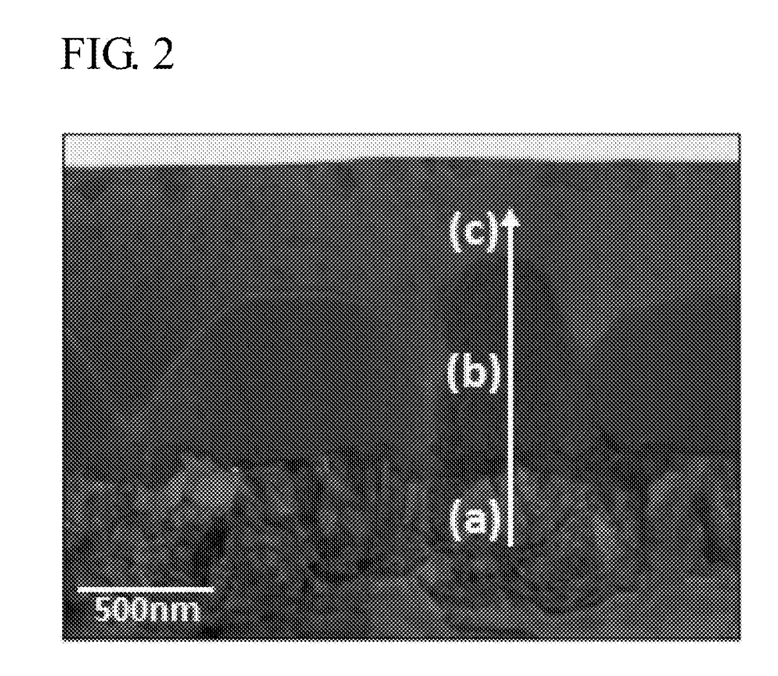
FIG. 2 is a STEM image of a section of a tin-plated copper alloy terminal material of Example 3.
Figure 3:
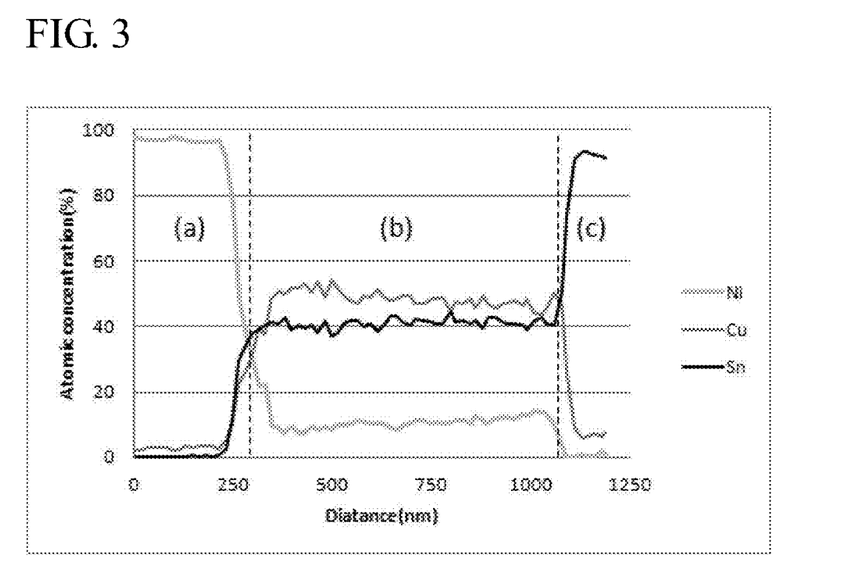
FIG. 3 is an analysis diagram of EDS along the white portion in FIG. 2.

FIG. 2 and FIG. 3 shows a STEM image of a section and an EDS analysis result of the test material of Example 3: the part (a) is the Ni layer, the part (b) is the Cu—Sn alloy layer made of (Cu, Ni)₆Sn₅, and the part (c) is the tin layer.

Figure 4:
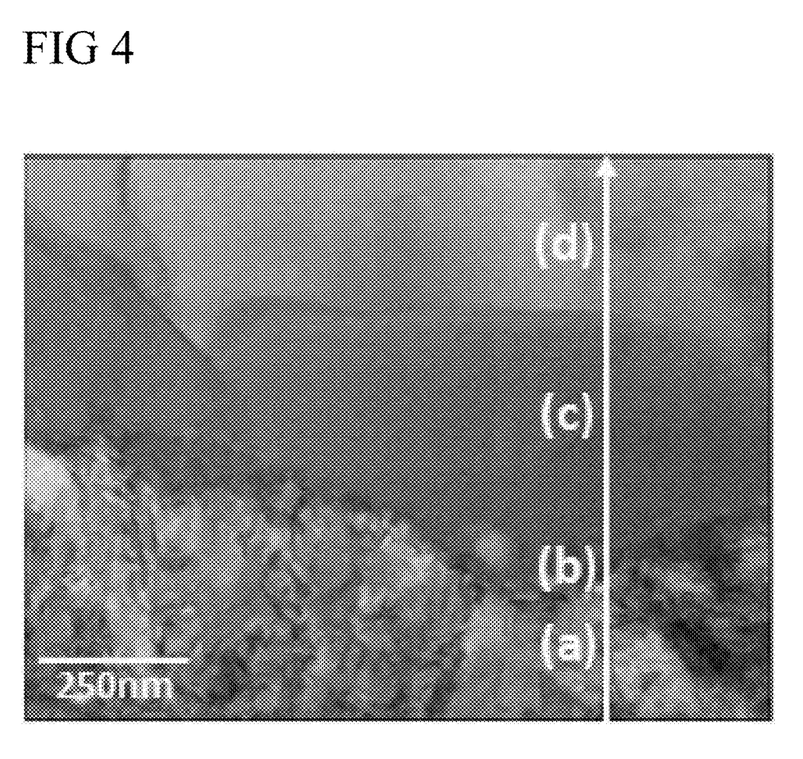
FIG. 4 is an STEM image of a section of a tin-plated copper alloy terminal material of Comparative Example 4.
Figure 5:
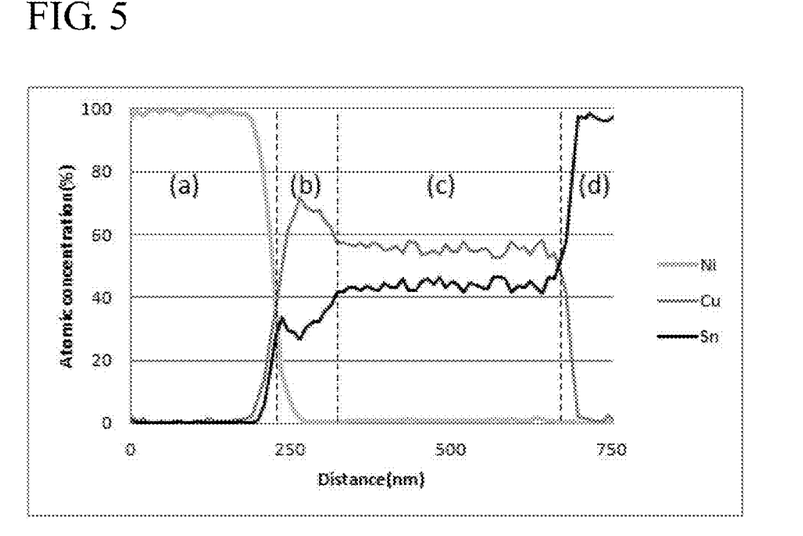
FIG. 5 is an analysis diagram of EDS along the white portion in FIG. 4.

FIGS. 4 and 5 shows a STEM image of a section and an EDS analysis result of Comparative Example 4: the part (a) is the Ni layer, the part (b) is the Cu₃Sn alloy layer, the part (c) is the (Cu, Ni)₆Sn₅ alloy layer, and the part (d) is the tin layer.

Figure 6:
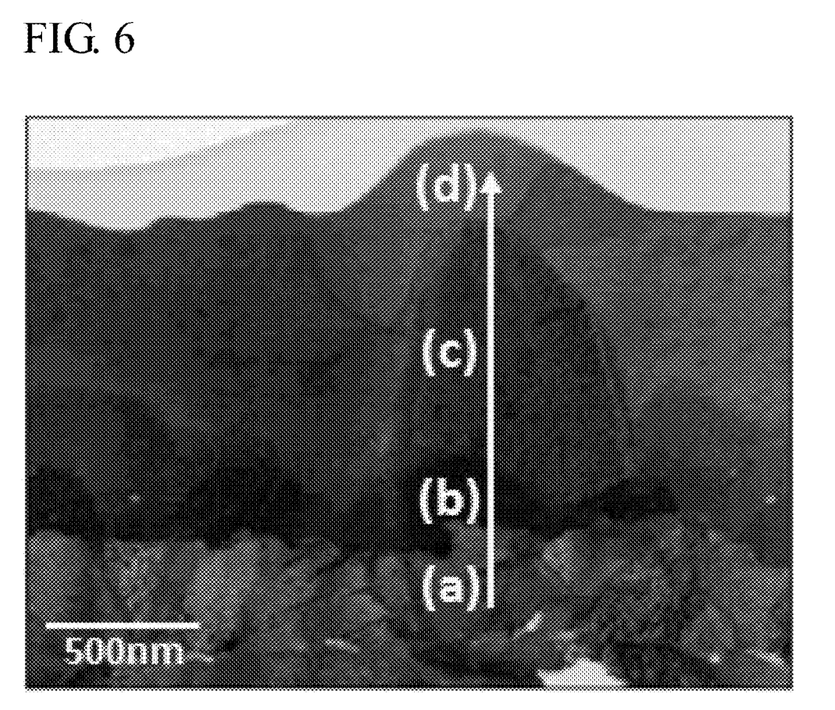
FIG. 6 is an STEM image of a section of a tin-plated copper alloy terminal material of Comparative Example 10.
Figure 7:
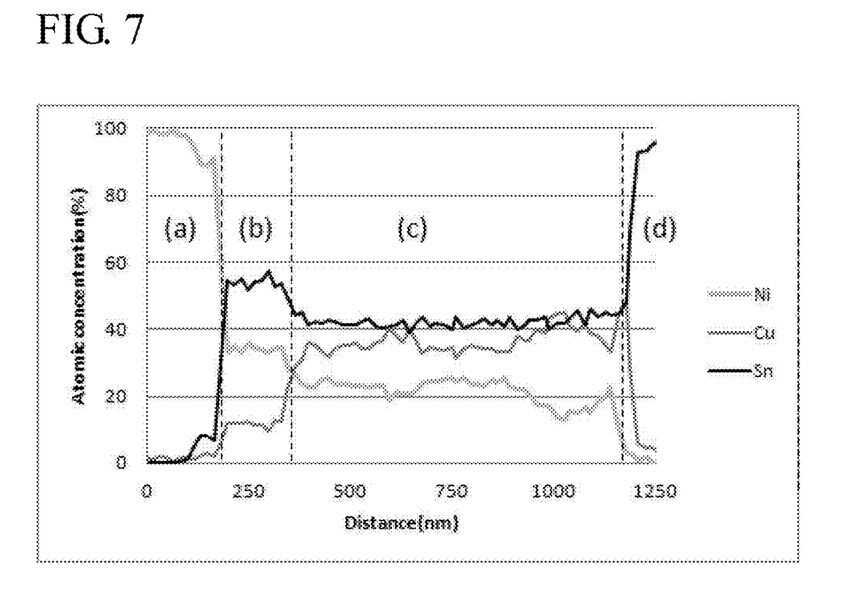
FIG. 7 is an analysis diagram of EDS along the white portion in FIG. 6.

FIGS. 6 and 7 shows a STEM image of a section and an EDS analysis result of Comparative Example 10: the part (a) is the Ni layer, the part (b) is the (Ni, Cu)₃Sn₄ alloy layer, the part (c) is the (Cu, Ni)₆Sn₅ alloy layer, and the part (d) is the tin layer.

As found by comparing these photographs and graphs, in Examples, the Cu—Sn alloy layer only made of Cu₆Sn₅ alloy ((Cu, Ni)₆Sn₅ alloy) including Ni between the Ni layer and the tin layer. Meanwhile, in Comparative Example 4, it is found that the Cu₃Sn alloy layer was formed on the boundary between the Cu₆Sn₅ alloy layer and the Ni layer, Ni was not included in Cu₆Sn₅ alloy, and the asperity of the Cu—Sn alloy layer was rough (or large) and gentle. Furthermore, in Comparative Example 10, it is found that the Ni₃Sn₄ alloy layer including Cu was formed at the boundary between the Cu₆Sn₅ alloy layer including Ni and the Ni layer.

INDUSTRIAL APPLICABILITY

The tin-plated copper alloy terminal material can be provided in which the low contact resistance, the good soldering wettability and the good insertion/extraction performance can be realized at the same time since the coefficient of kinetic friction is small; and it is effective even with the low load and suitable for a small terminal. Particularly, in terminals for automobiles, electronic component and the like, it has superiority at positions in which low insertion force for connecting, steady contact resistance, and good soldering wettability are necessary.

REFERENCE SIGNS LIST

11 table
12 male terminal test piece
13 female terminal test piece
14 load
15 load cell

The invention claimed is:
1. A tin-plated copper alloy terminal material comprising: a base material made of copper or a copper alloy, an Ni layer or Ni alloy layer formed on a surface of the base material; a Cu—Sn alloy layer formed on the Ni layer or Ni alloy layer; and a Sn-based surface layer formed on the Cu—Sn alloy layer, and wherein
    the Cu—Sn alloy layer consists of an intermetallic compound alloy which is obtained by substituting some of Cu in Cu₆Sn₅ alloy with Ni, parts of the Cu—Sn alloy layer are exposed from the Sn-based surface layer and form exposed portions,
    an average thickness of the Sn-based surface layer is 0.2 μm or larger and 0.6 μm or smaller,
    an area rate of the exposed portions of the Cu—Sn alloy layer relative to a surface area of a surface layer of the tin-plated copper alloy terminal material is 1% or higher and 40% or lower, an average circle-equivalent diameter of the exposed portions of the Cu—Sn alloy layer is 0.1 µm or larger and 1.5 µm or smaller, a reduced peak height Rpk at a surface of the tin-plated copper alloy terminal material is 0.005 µm or larger and 0.03 µm or smaller, and coefficient of kinetic friction is 0.3 or less.

2. The tin-plated copper alloy terminal material according to claim 1, wherein a content percentage of Ni in the Cu—Sn alloy layer is 1 at % or more and 25 at % or less.

* * * * *